US012602963B2

(12) United States Patent
Yanase et al.

(10) Patent No.: US 12,602,963 B2
(45) Date of Patent: Apr. 14, 2026

(54) CASH HANDLING APPARATUS

(71) Applicant: GLORY LTD., Himeji (JP)

(72) Inventors: Kisho Yanase, Himeji (JP); Shuang Gao, Himeji (JP); Zi Chen Feng, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/900,894

(22) Filed: Sep. 30, 2024

(65) Prior Publication Data

US 2025/0022334 A1 Jan. 16, 2025

Related U.S. Application Data

(63) Continuation of application No. PCT/JP2023/011509, filed on Mar. 23, 2023.

(30) Foreign Application Priority Data

Mar. 30, 2022 (JP) ................................ 2022-056234

(51) Int. Cl.
*G07D 11/00* (2019.01)
*G07D 5/00* (2006.01)
(Continued)

(52) U.S. Cl.
CPC ............. *G07D 11/009* (2013.01); *G07D 5/00* (2013.01); *G07D 11/20* (2019.01)

(58) Field of Classification Search
CPC ........ G07D 11/009; G07D 11/20; G07D 5/00; G06F 21/602; G06Q 20/1085;
(Continued)

(56) References Cited

U.S. PATENT DOCUMENTS

| | | | |
|---|---|---|---|
| 6,065,675 A | 5/2000 | Teicher | |
| 10,783,501 B1 | 9/2020 | Ramanathan et al. | |

(Continued)

FOREIGN PATENT DOCUMENTS

| | | | | |
|---|---|---|---|---|
| CN | 112288422 A | 1/2021 | | |
| GB | 2601049 A * | 5/2022 | ........... | H04L 9/3239 |

(Continued)

OTHER PUBLICATIONS

Development of digital currency technology (Year: 2019).*

(Continued)

*Primary Examiner* — Thien T Mai
(74) *Attorney, Agent, or Firm* — XSENSUS LLP

(57) ABSTRACT

In order to handle a central bank digital currency, a cash handling apparatus includes: a cash depositing port for depositing cash; a cash recognition circuit that recognizes a kind and authenticity of the cash; a cash storage that stores the cash; a digital cash depositing unit for depositing digital cash being a central bank digital currency for which one piece of data is issued per predetermined unit amount; and a digital cash storage that stores the digital cash. The cash handling apparatus accepts depositing of at least one of cash and digital cash. In a cash depositing process, cash deposited from the cash depositing port is recognized by the cash recognition circuit and stored in the cash storage. In a digital cash depositing process, data of digital cash inputted from the digital cash depositing port is stored in the digital cash storage.

10 Claims, 6 Drawing Sheets

(51) Int. Cl.
*G07D 11/20* (2019.01)
*G07F 7/02* (2006.01)

(58) Field of Classification Search
CPC ...... G06Q 20/18; G06Q 20/381; G06Q 40/04; G06Q 20/145; G06Q 20/223; G06Q 20/065; G06Q 20/0655; G06Q 2220/00
See application file for complete search history.

(56) References Cited

U.S. PATENT DOCUMENTS

| | | | | |
|---|---|---|---|---|
| 11,200,569 | B1 * | 12/2021 | James .................. | G06Q 20/381 |
| 2019/0318326 | A1 | 10/2019 | Russell et al. | |
| 2020/0151682 | A1 | 5/2020 | Hurry et al. | |
| 2020/0160331 | A1 | 5/2020 | Kurien et al. | |
| 2021/0133717 | A1 | 5/2021 | Inokami | |
| 2022/0083988 | A1 * | 3/2022 | Lynberg ............... | G06Q 20/389 |

FOREIGN PATENT DOCUMENTS

| | | | | |
|---|---|---|---|---|
| GB | 2620666 | A * | 1/2024 | ............... G07C 9/27 |
| JP | 2018-036786 | A | 3/2018 | |
| JP | 2020-013240 | A | 1/2020 | |
| JP | 2020-046820 | A | 3/2020 | |
| JP | 2022-506792 | A | 1/2022 | |
| KR | 10-2020-0022827 | A | 3/2020 | |
| WO | 2023/176774 | A1 | 9/2023 | |
| WO | 2023/176776 | A1 | 9/2023 | |

OTHER PUBLICATIONS

Digital Currency Risk (Year: 2018).*
International Search Report and Written Opinion mailed on May 9, 2023, received for PCT Application PCT/JP2023/011509, filed on Mar. 23, 2023, 9 pages including English Translation.

* cited by examiner

FIG.5

31

| | KIND | NUMBER | NUMBER OF TRANSFER TIMES | DENOMI-NATION | REPLENISHMENT THRESHOLD | COLLECTION THRESHOLD | SUBTOTAL | TOTAL |
|---|---|---|---|---|---|---|---|---|
| CASH (31a) | 100-RMB NOTE | 123··· | — | 123··· | 123··· | 123··· | 123··· | 123··· |
| | 50-RMB NOTE | 123··· | — | 123··· | 123··· | 123··· | | |
| | ⋮ | | | | | | | |
| DIGITAL CASH (31b) | AUTHENTICATED | — | — | 123··· | 123··· | 123··· | 123··· | |
| | UNAUTHENTICATED | — | 1 | 123··· | — | | | |

CASH HANDLING APPARATUS

CROSS-REFERENCE TO RELATED APPLICATIONS

The present application is a bypass continuation of, and claims priority to, International application PCT/JP2023/011509, filed Mar. 23, 2023, the entire contents of which is incorporated herein by reference. PCT/JP2023/011509 claims priority to JP 2022-056234, filed Mar. 30, 2022, the entire contents of which is incorporated herein by reference.

TECHNICAL FIELD

The present disclosure relates to a cash handling apparatus capable of handling cash and a central bank digital currency.

BACKGROUND ART

Conventionally, cash handling apparatuses for handling cash have been used in various places. For example, in a store where a transaction with a customer is performed, a cash handling apparatus is used for settlement of the monetary amount of the transaction. In recent years, the number of customers using electronic money to pay for their transactions has been increasing. A cash handling apparatus capable of handling both cash and electronic money for these customers is disclosed in some documents.

SUMMARY

A cash handling apparatus according to one aspect of the present disclosure includes: a cash depositing port for depositing cash; a cash recognition circuit configured to recognize a kind and authenticity of the cash; a cash storage configured to store the cash; a digital cash depositing unit for depositing digital cash that is a central bank digital currency for which one piece of data is issued per predetermined unit amount; and a digital cash storage configured to store the digital cash. In a depositing process, the cash handling apparatus accepts depositing of at least one of cash and digital cash. In the depositing process of cash, cash deposited from the cash depositing port is recognized by the cash recognition circuit and stored in the cash storage. In the depositing process of digital cash, data of digital cash inputted from the digital cash depositing unit is stored in the digital cash storage.

The objects, features, advantages, and technical and industrial significance of this disclosure will be better understood by the following description and the accompanying drawings of the disclosure.

BRIEF DESCRIPTION OF THE DRAWINGS

FIG. 5 shows an example of inventory amount data managed by the cash handling apparatus.

DESCRIPTION OF EMBODIMENTS

Conventionally, electronic money can be obtained by making a payment in legal tender issued by a central bank, in advance or later, to a private company that issues electronic money. Electronic money can be used like legal tender, i.e., like cash, in stores that handle electronic money. Meanwhile, since electronic money does not have the same value as cash in stores that do not handle electronic money, customers cannot use electronic money in such stores. Similarly, the number of stores that handle virtual currency is limited, and like electronic money, virtual currency is handled differently from cash in these stores.

Unlike such conventional electronic money and virtual currency, China has begun a trial operation of a digital currency called "digital renminbi". A central bank digital currency, such as the digital renminbi, issued by a central bank is expected to be usable like conventional cash. For this purpose, a cash handling apparatus that is different from the conventional apparatus and is capable of handling the central bank digital currency is required.

The present disclosure is made in view of the problem of the conventional art. The present disclosure addresses the problems, as discussed herein, with a cash handling apparatus capable of handling the central bank digital currency.

Figure 1:
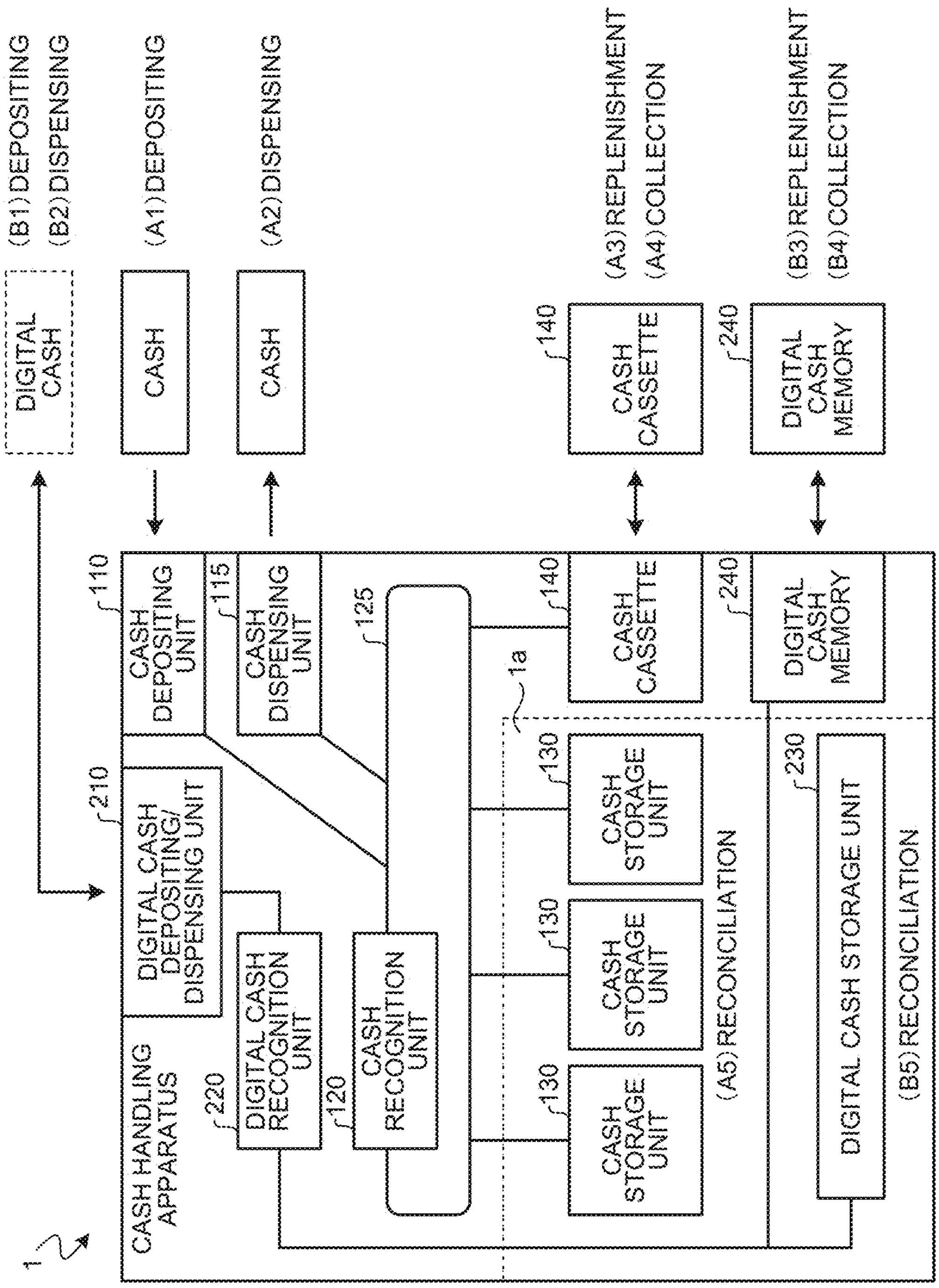
FIG. 1 is a schematic diagram illustrating an outline of a cash handling apparatus according to an embodiment of the present disclosure.

Hereinafter, a cash handling apparatus according to the present disclosure will be described with reference to the accompanying drawings. FIG. 1 is a schematic diagram illustrating an outline of a cash handling apparatus 1 according to the present embodiment. The cash handling apparatus 1 can handle a central bank digital currency as well as conventional cash. The central bank digital currency is a digital currency issued by a central bank. Specifically, the central bank digital currency is a currency that is legal tender, represented by digital data, and issued as a central bank liability. Hereinafter, in the present embodiment, conventional banknotes and coins are referred to as "cash" while the central bank digital currency is referred to as "digital-cash" to distinguish them. The "cash" described in the present embodiment includes at least one of "banknote" and "coin". In the present embodiment, digital-cash may sometimes be used to refer to data of digital-cash.

As shown in FIG. 1, the cash handling apparatus 1 includes a cash depositing unit 110, a cash dispensing unit 115, a cash recognition unit 120, a cash transport unit 125, cash storage units 130, and a cash cassette 140. The cash depositing unit 110 may be a cash depositing port. The cash recognition unit 120 may be a cash recognition circuit. The cash dispensing unit 115 may be a cash dispensing port. The cash handling apparatus 1 further includes a digital-cash depositing/dispensing unit 210, a digital-cash recognition unit 220, a digital-cash storage unit 230, and a digital-cash memory 240. The cash handling apparatus 1 may include a safe 1*a* indicated by broken lines in FIG. 1, and the cash storage unit 130 and the digital-cash storage unit 230 may be disposed in the safe 1*a*. Security can be ensured by disposing the storage units, in which cash and digital-cash are stored, in the safe 1*a*.

An example of cash handling performed by the cash handling apparatus 1 will be described. The cash depositing unit 110, the cash dispensing unit 115, the cash recognition unit 120, the cash transport unit 125, the cash storage unit 130, and the cash cassette 140 constitute a cash handling unit for handling cash. The configuration of the cash handling unit shown in FIG. 1 is an example, and is not limited thereto. For example, the cash depositing unit 110 and the cash dispensing unit 115 may be one component. The number of cash storage units 130 is not limited, and may be one, two, four, or more. The cash handling apparatus 1 may not necessarily include the cash cassette 140. The cash handling apparatus 1 may include components not shown in FIG. 1. For example, the cash handling apparatus 1 may include a reject unit for discharging cash, which is not to be stored in the cash handling apparatus 1, to the outside of the apparatus. The cash handling apparatus 1 may include a temporary storage unit for temporarily storing cash during cash handling.

The cash handling apparatus 1 can perform a cash depositing process (A1). In the depositing process, cash can be deposited from the cash depositing unit 110. The cash in the cash depositing unit 110 is transported one by one inside the apparatus by the cash transport unit 125. The cash is recognized by the cash recognition unit 120. The recognized cash is stored in any of the cash storage units 130 or the cash cassette 140.

The cash recognition unit 120 can recognize the kind (denomination) and authenticity of cash. The amount of cash is calculated based on the recognition result of the cash recognition unit 120. The cash recognition unit 120 may be able to recognize fitness, i.e., the degree of damage, of cash.

Each cash storage unit 130 may be assigned a kind of cash to be stored therein, and deposited cash may be stored in the cash storage unit 130 corresponding to the kind of the cash, based on the recognition result of the cash recognition unit 120. The kind of cash to be assigned to the cash storage units 130 may include at least one of denomination, authenticity, and fitness. For example, denominations may be assigned to the cash storage units 130, and deposited cash may be stored for each denomination into the cash storage units 130. Cash of a denomination that is not assigned to any of the cash storage units 130 may be stored in the cash cassette 140.

The cash handling apparatus 1 can perform a cash dispensing process (A2). In the dispensing process, cash can be dispensed from the cash dispensing unit 115. Cash to be dispensed is fed out from the cash storage unit 130, and transported one by one to the cash dispensing unit 115 by the cash transport unit 125. For example, cash is stored for each denomination in the cash storage units 130, and a required quantity of cash to be dispensed is fed out from the corresponding cash storage unit 130. In the dispensing process, the cash recognition unit 120 may recognize the cash to be dispensed.

The cash handling apparatus 1 can perform a cash replenishment process by using the cash cassette 140 (A3). In the replenishment process, the cash cassette 140 in which cash for replenishment has been stored in advance is mounted to the cash handling apparatus 1. Cash fed out from the cash cassette 140 is transported by the cash transport unit 125 and recognized by the cash recognition unit 120. Based on the recognition result, the cash is stored in the cash storage unit 130 corresponding to the kind of the cash.

The cash handling apparatus 1 can perform a cash collection process by using the cash cassette 140 (A4). In the collection process, cash to be collected from the cash handling apparatus 1 is fed out from the cash storage unit 130, transported by the cash transport unit 125, and stored in the cash cassette 140. The cash can be collected by dismounting the cash cassette 140 from the cash handling apparatus 1. In the collection process, the cash recognition unit 120 may recognize the cash to be collected.

The cash handling apparatus 1 can perform a reconciliation process for checking cash stored in the cash storage units 130 (A5). In the reconciliation process, cash to be checked is fed out from the cash storage unit 130, transported by the cash transport unit 125, and recognized by the cash recognition unit 120. The reconciliation process may be performed for all the cash stored in each cash storage unit 130, or may be performed for a part of the cash. For example, the reconciliation process is started after replacing the cash cassette 140 with an empty cash cassette 140 prepared for the reconciliation process. The cash handling apparatus 1 temporarily stores the cash, which has been fed out from the cash storage unit 130 and recognized by the cash recognition unit 120, into the cash cassette 140 for the reconciliation process. After completing recognition of the cash to be subjected to the reconciliation process, the cash handling apparatus 1 returns the cash temporarily stored in the cash cassette 140 to the cash storage unit 130, whereby the cash stored in the cash storage unit 130 can be checked. However, the cash cassette 140 may not necessarily be replaced with the empty cash cassette 140 for the reconciliation process. The cash temporarily stored in the cash cassette 140 may not necessarily be returned to the cash storage unit 130.

Since the configuration and operation of the cash handling apparatus 1 that performs cash handling such as the depositing process, the dispensing process, the replenishment process, the collection process, and the reconciliation process have been conventionally known, detailed description thereof will be omitted. The cash handling apparatus 1 can handle actual cash as described above.

Figure 2:
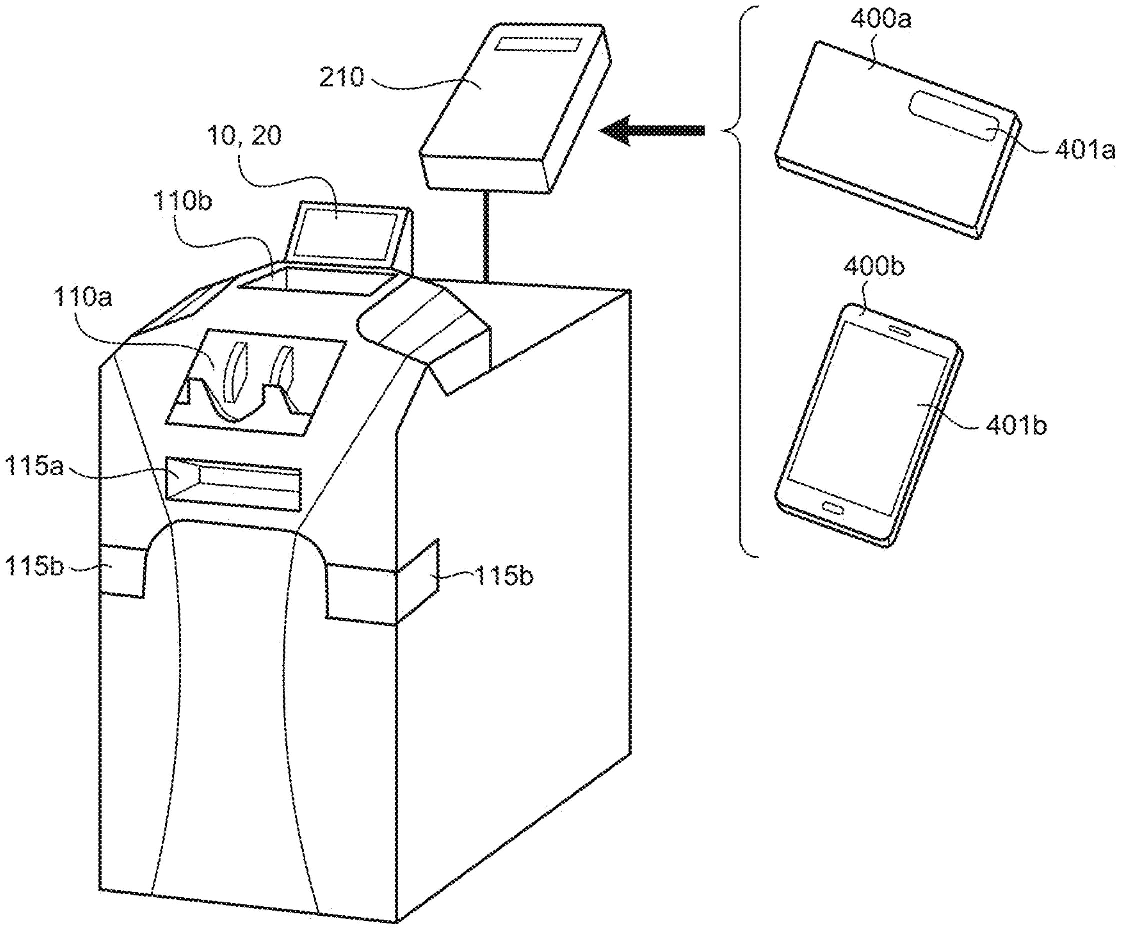
FIG. 2 shows an example of an appearance of the cash handling apparatus.

Next, an example of the configuration of the cash handling apparatus 1 will be described. FIG. 2 shows an example of the appearance of the cash handling apparatus 1. The cash handling apparatus 1 shown in FIG. 2 includes a banknote depositing unit 110*a* and a coin depositing unit 110*b* as the cash depositing unit 110, and a banknote dispensing unit 115*a* and a coin dispensing unit 115*b* as the cash dispensing unit 115. This cash handling apparatus 1 can perform the aforementioned cash handling for banknotes and coins. However, the cash handling apparatus 1 may be an apparatus for handling only banknotes, or only coins.

The cash handling apparatus 1 includes an operation unit 10 for inputting various kinds of information on cash handling and digital-cash handling, and a display unit 20 for displaying various kinds of information on cash handling and digital-cash handling. However, the cash handling apparatus 1 may not necessarily include the operation unit 10 and the display unit 20. For example, an operation terminal including the operation unit 10 and the display unit 20 may be connected to the cash handling apparatus 1 to be used for inputting and outputting various kinds of information.

Figure 3:
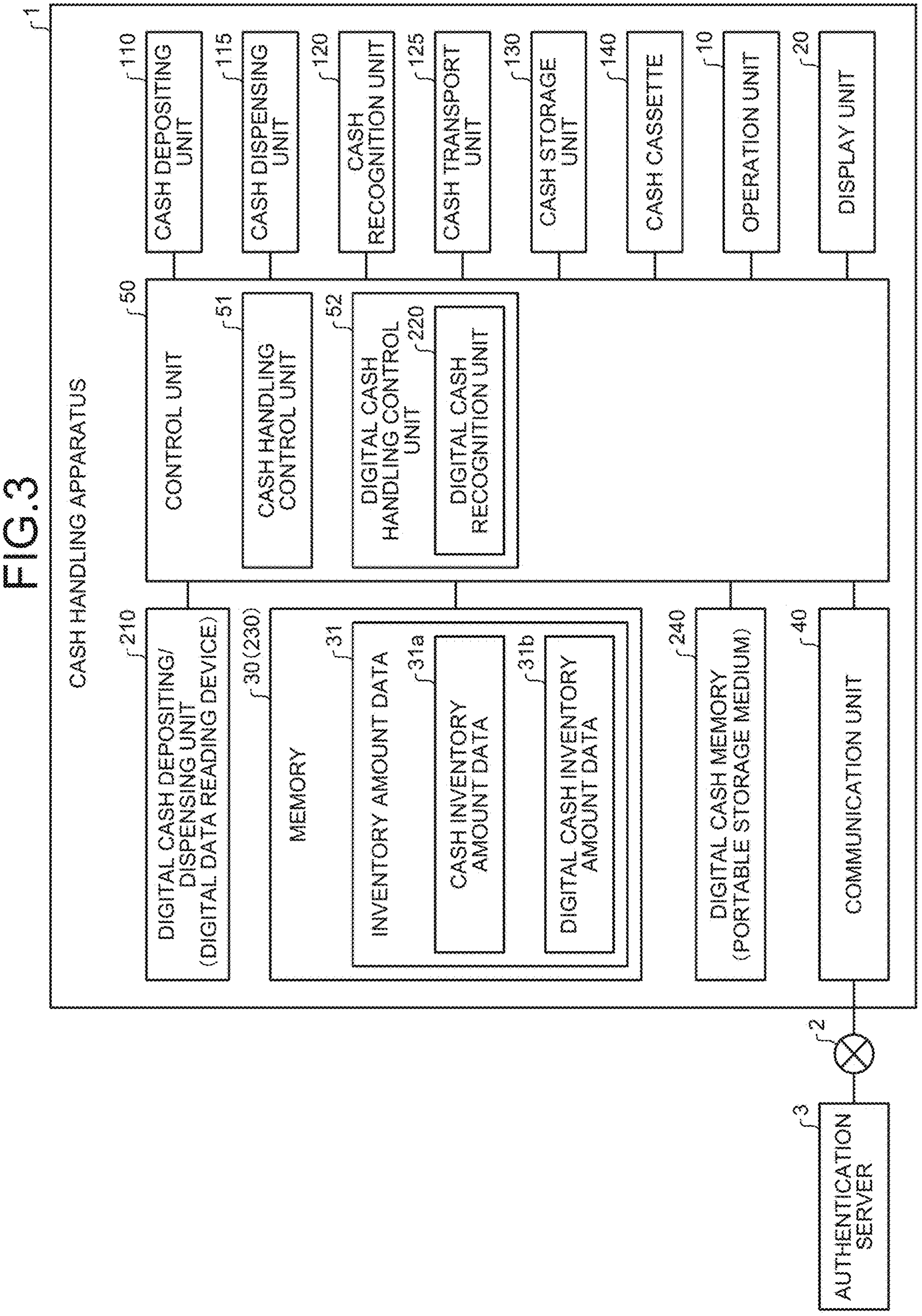
FIG. 3 is a block diagram schematically showing a functional configuration of the cash handling apparatus.

FIG. 3 is a block diagram schematically showing the functional configuration of the cash handling apparatus 1. As shown in FIG. 3, the cash handling apparatus 1 includes a memory 30, a communication unit 40, and a control unit 50 in addition to the components shown in FIG. 1 and FIG. 2.

Inventory amount data 31 is stored in the memory 30. The inventory amount data 31 includes cash inventory amount data 31*a* indicating the inventory amount of cash, and digital-cash inventory amount data 31*b* indicating the inventory amount of digital-cash, which will be described later.

The memory 30 is used as a digital-cash storage unit 230 for storing data of digital-cash. In other words, the memory 30 configured to store data of digital-cash functions as the digital-cash storage unit 230. For example, the cash storage unit 130 stores a large quantity of cash. Similarly, the digital-cash storage unit 230 stores a large quantity of data of digital-cash that is issued in each predetermined unit amount, which will be described later.

The memory 30 may have, stored therein, identification information indicating an owner of the digital-cash in the apparatus. The identification information stored in the memory 30 clarifies the owner of the digital-cash stored in the digital-cash storage unit 230 of the memory 30. The memory 30 may also be used for storage of various kinds of information such as settings, programs, and data required for performing the cash handling and the digital-cash handling.

The digital-cash depositing/dispensing unit 210 is a data reading device. The digital-cash depositing/dispensing unit 210 can perform data reading and data writing. The digital-cash depositing/dispensing unit 210 can acquire the amount of digital-cash. The digital-cash depositing/dispensing unit 210 is used for depositing and dispensing digital-cash. In the depositing process, the digital-cash depositing/dispensing unit 210 is used for reading from memory data of digital-cash to be deposited, and acquiring the amount of the digital-cash to be deposited. In the dispensing process, the digital-cash depositing/dispensing unit 210 is used for writing data of digital-cash to be dispensed, and acquiring the amount of the digital-cash to be dispensed. The digital-cash depositing/dispensing unit 210 can recognize authenticity of digital-cash. That is, the digital-cash depositing/dispensing unit 210 can check authenticity of data of digital-cash. The method by which the digital-cash depositing/dispensing unit 210 reads and writes data is not particularly limited. Data reading and writing may be performed on a physically-connected storage medium or device, or may be performed on a storage medium or device through communication in a noncontact manner. A reading device conforming to the data format of digital-cash is used as the digital-cash depositing/dispensing unit 210. For example, if data of digital-cash is transmitted/received by using a short-range wireless communication technology such as Bluetooth (registered trademark) or NFC, a reading device conforming to the communication method is used as the digital-cash depositing/dispensing unit 210. For another example, if data of digital-cash is transmitted/received by using graphic codes such as bar codes or two-dimensional codes, a reading device and a display device for such graphic codes are used as the digital-cash depositing/dispensing unit 210.

The digital-cash memory 240 is a portable storage medium that is mountable/dismountable to/from the cash handling apparatus 1. For example, a card type storage medium, a stick type storage medium, or the like is used as the digital-cash memory 240. The digital-cash memory 240 is used to exchange data of digital-cash with an external device, and it allows the digital-cash to be moved between the cash handling apparatus 1 and the external device. The digital-cash memory 240 may not necessarily be used alone, and may be built in the cash cassette 140.

The communication unit 40 is used for communicating with an external device communicably connected to the cash handling apparatus 1, via the network 2. The external devices with which the cash handling apparatus 1 communicates may include an authentication server 3 that authenticates digital-cash, which will be described later.

The control unit 50 is a control circuitry that controls the components of the cash handling apparatus 1. For example, a program corresponding to the control unit 50 is stored in advance in the memory 30 or a dedicated memory device, and this program is executed by hardware such as a CPU, thereby realizing the function and operation of the control unit 50. The control unit 50 includes a cash handling control unit 51 that controls the components of the apparatus during the cash handling, and a digital-cash handling control unit 52 that controls the components of the apparatus during the digital-cash handling. The digital-cash handling control unit 52 includes the digital-cash recognition unit 220. The control unit 50 controls the components of the apparatus while using the various kinds of information stored in the memory 30, thereby realizing the operation of the cash handling apparatus 1 according to the present embodiment.

Next, an example of digital-cash handling performed by the cash handling apparatus 1 will be described. The digital-cash depositing/dispensing unit 210, the digital-cash recognition unit 220, the digital-cash storage unit 230, and the digital-cash memory 240 shown in FIG. 1 constitute a digital-cash handling unit for handling digital-cash. The configuration of the digital-cash handling unit is an example, and is not limited thereto. For example, the digital-cash depositing/dispensing unit 210 may be separated to a digital-cash depositing unit and a digital-cash dispensing unit. The digital-cash recognition unit 220 may not necessarily be disposed in the cash handling apparatus 1, and the cash handling apparatus 1 may perform a digital-cash recognition process by using an external device including a digital-cash recognition unit. Specifically, the cash handling apparatus 1 may transmit data of digital-cash to the external device, and receive a recognition result of each piece of data from the external device. The cash handling apparatus 1 may not necessarily include the digital-cash recognition unit 220, and the digital-cash depositing/dispensing unit 210 may serve as the digital-cash recognition unit 220. A plurality of digital-cash storage units 230 may be provided inside the apparatus. The cash handling apparatus 1 may not necessarily include the digital-cash memory 240. The digital-cash memory 240 may be built in the cash cassette 140. The cash handling apparatus 1 may include a component not shown in FIG. 1.

A depositing process and a dispensing process for digital-cash are performed using the digital-cash depositing/dispensing unit 210. The digital-cash depositing/dispensing unit 210 is not limited to an external device connected to the cash handling apparatus 1 as shown in FIG. 2, and may be built in the cash handling apparatus 1.

As shown in FIG. 2, digital-cash can be carried using a digital wallet 400 (400*a*, 400*b*) that includes a display unit 401 (401*a*, 401*b*) and a memory. For example, a card type digital wallet 400*a* including the display unit 401*a* and the memory is used for carrying the digital-cash. Data of digital-cash is stored in the memory disposed in the digital wallet 400*a*. The amount of digital-cash in the digital wallet 400*a* is displayed on the display unit 401*a*. The owner of the digital wallet 400*a* can check the amount of digital-cash remaining in the digital wallet 400*a* by using the display unit 401*a*.

For example, a digital terminal such as a smartphone in which an application for digital-cash is installed is used as the digital wallet 400*b*. Data of digital-cash is stored in the memory disposed in the digital wallet 400*b*. The application for digital-cash is executed in the digital wallet 400*b*, whereby the amount of digital-cash in the digital wallet 400*b* is displayed on the display unit 401*b*. The owner of the digital wallet 400*b* can check the amount of digital-cash remaining in the digital wallet 400*b* by using the display unit 401*b*.

In the memory of the digital wallet 400, identification information indicating the owner of the digital wallet 400 is stored in addition to the data of digital-cash. When a user spends the digital-cash, the user of the digital-cash, i.e., the owner of the digital wallet 400, can be identified based on the identification information.

Digital cash is data that has a value equivalent to a predetermined unit amount. The unit amount of digital-cash may be smaller than that of cash circulating in the market. For example, in the case of Chinese currency, the unit amount of digital-cash may not necessarily to be 1 RMB or 0.1 RMB in the market, and may be 0.01 RMB. Hereinafter, the description will be continued for the case where the unit amount of digital-cash is 0.01 RMB, that is, one piece of data of digital-cash is issued per 0.01 RMB.

Digital cash is data that has a value equivalent to 0.01 RMB that is a unit amount, and each piece of data is identified and managed by unique information. The unique information of digital-cash corresponds to the serial number of a banknote. Digital-cash can be uniquely identified by the unique information, just like a banknote is uniquely identified by the serial number. For example, a hash value generated by using a predetermined hash function is used as the unique information. The unique information may be encrypted. Each piece of data of digital cash issued in 0.01 RMB units may include the unique information. The unique information itself may be used as data of digital-cash.

The digital wallet 400 stores data of digital-cash in units of 0.01 RMB. When depositing/dispensing of money is performed between the digital wallet 400 and the cash handling apparatus 1, data equivalent to 0.01 RMB is transferred by the number corresponding to the monetary amount via the digital-cash depositing/dispensing unit 210. For example, if digital-cash of 1000 RMB remains in the digital wallet 400, 100,000 pieces of data of digital-cash (=1000 RMB/0.01 RMB) are stored in the memory of the digital wallet 400. When digital-cash of 100 RMB is deposited from the digital wallet 400 to the cash handling apparatus 1, 10,000 pieces of data of digital-cash (=100 RMB/0.01 RMB) are transferred from the digital wallet 400 to the cash handling apparatus 1. When digital-cash of 100 RMB is dispensed from the cash handling apparatus 1 to the digital wallet 400, 10,000 pieces of data of digital-cash is transferred from the cash handling apparatus 1 to the digital wallet 400. Hereinafter, kinds of digital-cash handling that can be performed by the cash handling apparatus 1 will be described.

As shown in FIG. 1, the cash handling apparatus 1 can perform a digital-cash depositing process (B1). In the depositing process, data of digital-cash equivalent to the amount to be deposited is transferred from the digital wallet 400 to the cash handling apparatus 1. Specifically, the data of digital-cash equivalent to the amount to be deposited is read out from the memory of the digital wallet 400, and transmitted to the cash handling apparatus 1 via the digital-cash depositing/dispensing unit 210. The transmitted data is stored in the digital-cash storage unit 230, i.e., the memory 30, in the cash handling apparatus 1. In addition to the data of the deposited digital-cash, date and time of receiving the data may be stored in the memory 30. Furthermore, identification information indicating the owner of the digital wallet 400 may be received from the digital wallet 400, stored in the memory 30, and associated with other stored data. At least one of the data of the deposited digital-cash and the relevant data may be stored in the digital-cash memory 240.

The digital-cash depositing/dispensing unit 210 can perform a recognition process for recognizing digital-cash during the depositing process. For example, the digital-cash depositing/dispensing unit 210 recognizes authenticity of data of digital-cash by using information for recognition provided by the central bank that has issued the digital-cash. The information for recognition may be stored in a memory included in the digital-cash depositing/dispensing unit 210, or the memory 30. The information for recognition may be acquired from an external device such as the authentication server 3 via the network 2 during the recognition process. If the information for recognition has been stored in the apparatus, the cash handling apparatus 1 may perform an information updating process at a predetermined timing. The cash handling apparatus 1 may manage the update as a version of the digital-cash depositing/dispensing unit 210. The cash handling apparatus 1 can specify the deposit amount of digital-cash deposited from the digital wallet 400 to the apparatus by performing the recognition process. For example, if the cash handling apparatus 1 receives 200,000 pieces of data of digital-cash from the digital wallet 400 and recognizes them as genuine, the deposit amount is 2000 RMB (=0.01 RMB×200,000). The cash handling apparatus 1 may not necessarily perform the recognition process, and the recognition process may be performed by an external device such as the authentication server 3 connected to the cash handling apparatus 1 via the network 2. The recognition process may be performed by the digital-cash recognition unit 220. In this case as well, the digital-cash recognition unit 220 may perform the recognition process by using the information for recognition that is provided by the central bank having issued the digital-cash and is stored in the apparatus, or may perform the recognition process by using the information for recognition acquired from the external device via the network 2. If the information for recognition has been stored in the apparatus, the cash handling apparatus 1 may perform an information update process at a predetermined timing. The cash handling apparatus 1 may manage the update as a version of the digital-cash recognition unit 220.

The cash handling apparatus 1 can perform a digital-cash dispensing process (B2). In the dispensing process, data of digital-cash corresponding to the amount to be dispensed is transferred from the cash handling apparatus 1 to the digital wallet 400. Specifically, one or a plurality of pieces of data of digital-cash equivalent to the amount to be dispensed are read out from the digital-cash storage unit 230, i.e., the memory 30, in the cash handling apparatus 1, and transmitted to the digital wallet 400 via the digital-cash depositing/dispensing unit 210. The transmitted data is stored in the memory disposed in the digital wallet 400. The data of digital-cash to be dispensed may be read out from the digital-cash memory 240.

In the dispensing process, the digital-cash depositing/dispensing unit 210 may recognize the digital-cash to be dispensed. The digital-cash recognition unit 220 may recognize the digital-cash to be dispensed. Recognition of digital-cash can be performed in the same way as in the depositing process. It is possible to check authenticity of data of the digital-cash to be dispensed by performing the recognition process during the dispensing process.

The cash handling apparatus 1 can perform a digital-cash replenishment process by using the digital-cash memory 240 (B3). In the replenishment process, the digital-cash memory 240, in which data of digital-cash for replenishment is stored in advance, is mounted to the cash handling apparatus 1. Data of digital-cash equivalent to a replenishment amount is transferred from the digital-cash memory 240 to the cash handling apparatus 1. Specifically, one or a plurality of pieces of data of digital-cash equivalent to the replenishment amount are read out from the digital-cash memory 240 mounted to the cash handling apparatus 1, and stored in the digital-cash storage unit 230, i.e., the memory 30. In the replenishment process, the digital-cash depositing/dispensing unit 210 or the digital-cash recognition unit 220 may perform a recognition process for checking authenticity of the data of digital-cash for replenishment. The digital-cash replenishment process for the digital-cash storage unit 230 may be performed simultaneously with the cash replenishment process for the cash storage unit 130. The replenishment process for the cash storage unit 130 and the replenishment process for the digital-cash storage unit 230 may be performed independently from each other. For example, the cash cassette 140 used for the cash replenishment process may include the digital-cash memory 240, and replenishment of cash from the cash cassette 140 and replenishment of digital-cash from the digital-cash memory 240 may be performed in parallel.

The cash handling apparatus 1 can perform a digital-cash collection process by using the digital-cash memory 240 (B4). In the collection process, data of digital-cash equivalent to a collection amount is transferred from the cash handling apparatus 1 to the digital-cash memory 240. Specifically, one or a plurality of pieces of data of digital-cash equivalent to the collection amount are read out from the digital-cash storage unit 230, i.e., from the memory 30, and stored in the digital-cash memory 240 mounted to the cash handling apparatus 1. The digital-cash can be collected by dismounting the digital-cash memory 240 from the cash handling apparatus 1. In the collection process, the digital-cash depositing/dispensing unit 210 or the digital-cash recognition unit 220 may perform a recognition process for checking authenticity of the data of digital-cash to be collected. The digital-cash collection process from the digital-cash storage unit 230 may be performed simultaneously with the cash collection process from the cash storage unit 130. The collection process from the cash storage unit 130 and the collection process from the digital-cash storage unit 230 may be performed independently from each other. For example, the cash cassette 140 used for the cash collection process may include the digital-cash memory 240, and collection of cash into the cash cassette 140 and collection of digital-cash into the digital-cash memory 240 may be performed in parallel.

At least one of depositing process, dispensing process, replenishment process, and collection process of the digital-cash may be performed by using the network 2. It is possible to perform digital-cash handling for transferring data of digital-cash as described above by transmitting and receiving the data of digital-cash via the network 2 between the digital-cash transfer source such as the digital wallet 400, the digital-cash memory 240, or the cash handling apparatus 1 and the digital-cash transfer destination such as the digital wallet 400, the digital-cash memory 240, or the cash handling apparatus 1.

The cash handling apparatus 1 can perform a reconciliation process for checking data of digital-cash stored in the digital-cash storage unit 230 (B5). In the reconciliation process, data of digital-cash to be checked is recognized by the digital-cash depositing/dispensing unit 210 or the digital-cash recognition unit 220. The reconciliation process may be performed for all the data of digital-cash stored in the digital-cash storage unit 230, or may be performed for a part of the data. The digital-cash reconciliation process may be performed by using an external device. For example, the cash handling apparatus 1 transmits the data of digital-cash to be checked in the reconciliation process, to an external device such as the authentication server 3 that can check authenticity of the data. The cash handling apparatus 1 performs the reconciliation process for the digital-cash, upon receiving the result of recognition of authenticity of the data of the digital-cash performed by the external device. For example, when performing the reconciliation process for the cash in the cash storage unit 130, the reconciliation process for the digital-cash in the digital-cash storage unit 230 may be performed simultaneously. Alternatively, the reconciliation process for the cash storage unit 130 and the reconciliation process for the digital-cash storage unit 230 may be performed independently from each other.

Figure 4:
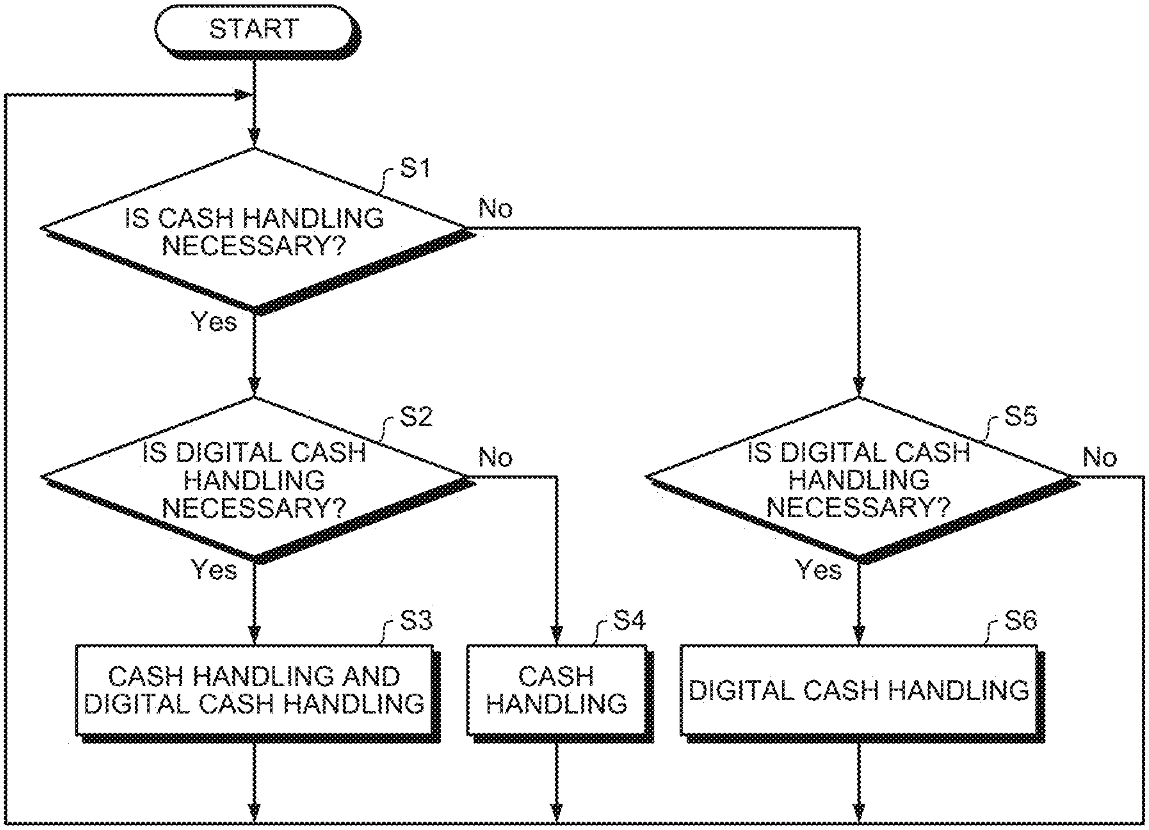
FIG. 4 is a flowchart showing a flow of processes performed by the cash handling apparatus.

FIG. 4 is a flowchart showing a flow of processing performed by the cash handling apparatus 1. The cash handling apparatus 1 is in a waiting state when cash handing is not necessary (step S1; No) and digital-cash handling is not necessary (step S5; No).

When cash handling becomes necessary (step S1; Yes) and digital-cash handling becomes necessary (step S2; Yes), the cash handling apparatus 1 performs the cash handing and the digital-cash handling (step S3). If the cash handling is necessary (step S1; Yes) but the digital-cash handling is not necessary (step S2; No), the cash handling apparatus 1 performs the cash handling (step S4). If the cash handling is not necessary (step S1; No) but the digital-cash handling is necessary (step S5; Yes), the cash handling apparatus 1 performs the digital-cash handling (step S6).

For example, when the cash handling apparatus 1 is installed in a store to perform a checkout process for a transaction between the store and a customer, the customer can pay for the transaction amount by cash and/or digital-cash. The customer can pay for a part of the transaction amount by cash, and pay for the remaining amount by digital-cash. When a part or the entirety of the transaction amount is paid by cash, the cash handling apparatus 1 performs the cash depositing process as described above. When a part or the entirety of the transaction amount is paid by digital-cash, the cash handling apparatus 1 performs the digital-cash depositing process as described above.

If it is necessary to return a change to the customer during the transaction, the cash handling apparatus 1 can dispense the change by cash and/or digital-cash. The customer can select cash or digital-cash by which he/she can get the change back. The customer can get a part of the change amount by cash and the remaining amount by digital-cash. When a part or the entirety of the change is returned to the customer by cash, the cash handling apparatus 1 performs the cash dispensing process as described above. When a part or the entirety of the change is returned to the customer by digital-cash, the cash handling apparatus 1 performs the digital-cash dispensing process as described above.

If the inventory amount of the cash in the cash handling apparatus 1 has been changed due to the cash handling, the cash handling apparatus 1 updates the cash inventory amount data 31*a* included in the inventory amount data 31 stored in the memory 30. Likewise, if the inventory amount of the digital-cash in the cash handling apparatus 1 has been changed due to the digital-cash handling, the cash handling apparatus 1 updates the digital-cash inventory amount data 31*b* included in the inventory amount data 31 stored in the memory 30.

The digital-cash handling causes the data of digital-cash to be transferred, whereby the data storage place is changed. In the depositing process, the owner of the digital-cash is changed from the owner of the digital wallet 400 to the owner of the cash handling apparatus 1. In the dispensing process, the owner of the digital-cash is changed from the owner of the cash handling apparatus 1 to the owner of the digital wallet 400.

The replenishment process and the collection process are performed by a financial institution or a cash-in-transit company, for example. In the replenishment process, the owner of the digital-cash is changed from the financial institution or the cash-in-transit company to the owner of the cash handling apparatus 1. In the collection process, the owner of the digital-cash is changed from the owner of the cash handling apparatus 1 to the financial institution or the cash-in-transit company.

When the data of digital-cash has been transferred and the owner has been changed as described above, the number of times the data of digital-cash can be transferred may be limited to a predetermined number of times unless the digital-cash is authenticated by the authentication server 3.

For example, the content of data, the data format, etc., of digital-cash may be changed and updated to ensure security of the digital-cash. The authentication server 3 may apply such a change to the data of digital-cash when authenticating the digital cash. By setting a limitation on the number of transfer times of unauthenticated digital-cash, it can avoid a situation where the digital-cash before applying the change is continuously used for a long time period. For another example, it can be set that the identification information of the owner of the digital-cash is transmitted together with data of the digital-cash to the authentication server 3 when the digital-cash is authenticated, whereby the owner of the digital-cash can be identified by the authentication server 3. It is possible to deter crimes such as theft of digital-cash by making it impossible to continue using the digital-cash unless the owner is identified through authentication by the authentication server 3.

Such limitation on transfer of unauthenticated digital-cash may be limit on the number of times of transfers during which the storage place of the data of digital-cash is changed regardless of whether the owner of the digital-cash is changed. The limitation on transfer of unauthenticated digital-cash may be limit on the number of times of transfers during which the owner is changed. Specifically, all transfers, including transfer between the digital wallet 400 and the cash handling apparatus 1 owned by the same owner, may be counted to limit the number of transfer times. Alternatively, transfer of data of digital-cash during which the owner is changed may be counted as one transfer, while data transfer performed between the digital wallet 400 and the cash handling apparatus 1 owned by the same owner is not included in the number of transfer times.

For example, if the upper-limit of the number of transfer times is set to 3, data of digital-cash, which has not been authenticated and whose number of transfer times has reached 3, cannot be transferred. In this case, the cash handling apparatus 1 or the digital wallet 400, in which the data is stored, may be connected to the network 2 to obtain authentication for the data from the authentication server 3, whereby the data of digital-cash may become transferable again.

For example, count of the number of transfer times of digital-cash may be started when the owner of the digital-cash is changed. When data of digital-cash is transferred between the digital wallet 400 and the cash handling apparatus 1, information indicating that the number of transfer times is "1" is included in each piece of data. For example, the information indicating the number of transfer times may be included in an input value of a predetermined hash function for calculating unique information of digital-cash, and the unique information being a hash value may be updated to include the transfer times. Update of such a unique value is preferably performed at the digital wallet 400 or the cash handling apparatus 1 which is a digital-cash transfer source, but may be performed at a transfer destination. When the cash handling apparatus 1 of a digital-cash transfer destination obtains authentication for the digital-cash from the authentication server 3, the number of transfer times included in the data is reset from "1" to "0". Meanwhile, when transferring the digital-cash that is not authenticated by the authentication server 3, the cash handling apparatus 1 may update the number of transfer times to "2" from "1" before transferring the digital-data. The process regarding the number of transfer times may also be performed by the digital wallet 400. In the digital-cash handling, the digital wallet 400 or the cash handling apparatus 1 of the digital-cash transfer destination specifies the number of transfer times from the data of digital-cash, and refuses reception of the data of digital-cash whose number of transfer times has reached the upper-limit. Thus, it is possible to limit the number of transfer times of unauthenticated digital-cash. The method regarding the number of transfer times is an example, and is not limited thereto. For example, data of digital-cash may include information on the number of transfer times, in addition to and separated from the unique information. The information on the number of transfer times may be encrypted.

Likewise, when the owner of digital-cash has been changed, data of the digital-cash may become not transferable unless the digital-cash is authenticated by the authentication server 3 within a predetermined period, which is set in advance, from the change.

For example, if an authentication period is set to 3 days from transfer of data, data of digital-cash that has not been authenticated for 3 days becomes not transferable. In this case, the cash handling apparatus 1 or the digital wallet 400, in which this data is stored, may be connected to the network 2 to obtain authentication for the data from the authentication server 3, whereby the data of the digital-cash may become transferable.

For example, transfer date and time of digital-cash may be recorded when the owner of the digital-cash has been changed. When transferring data of digital-cash between the digital wallet 400 and the cash handling apparatus 1, the data includes information indicating the transfer date and time and a flag value indicating "unauthenticated". For example, the flag value and the information indicating the transfer date and time may be included in an input value of a predetermined hash function for calculating unique information of digital-cash, and the unique information being a hash value may be updated to include them. Update of such a unique value is preferably performed in an apparatus of a digital-cash transfer source, but may be performed in an apparatus of a transfer destination. When the cash handling apparatus 1 of a digital-cash transfer destination obtains authentication for the digital-cash from the authentication server 3, the data is updated so as to indicate that the digital-cash has already been authenticated. For example, a flag value indicating "already authenticated" is included in an input value of a hash function for calculating unique information, and the unique information is updated to include the flag value. The process regarding transfer date and time and a flag value may also be performed in the digital wallet 400. In the digital-cash handling, the digital wallet 400 or the cash handling apparatus 1 of a digital-cash transfer destination specifies whether or not the digital-cash has already been authenticated. If the digital-cash is unauthenticated, the digital wallet 400 or the cash handling apparatus 1 specifies a period that has elapsed from the transfer date and time, and refuses reception of data of digital-cash that is not authenticated until the authentication time limit. Thus, use of digital-cash that has not been authenticated until the authentication time limit can be restricted. The processing method regarding the authentication time limit is an example, and is not limited thereto. For example, data of digital-cash may include information on the authentication time limit, in addition to and separated from the unique information. The information on the authentication time limit may be encrypted.

If an upper limit is set to the number of transfer times of unauthenticated digital-cash, the cash handling apparatus 1 can display, on the display unit 20, information on the number of transfer times of unauthenticated digital-cash. Likewise, if there is an authentication time limit for digital-cash, the cash handling apparatus 1 can display, on the display unit 20, information on transfer date and time of the unauthenticated digital-cash. This allows the user of the cash handling apparatus 1 to check the information on the unauthenticated digital-cash, and take a predetermined countermeasure to obtain authentication by the authentication server 3. The information on the unauthenticated digital-cash may be used for version management of the digital-cash depositing/dispensing unit 210 and the digital-cash recognition unit 220. For example, if the version of the digital-cash depositing/dispensing unit 210 or the digital-cash recognition unit 220 for checking authenticity of data of digital-cash is not updated to the latest version, the cash handling apparatus 1 may handle the digital-cash as being unauthenticated, and notify the user of the cash handling apparatus 1 that update to the latest version is necessary.

FIG. 5 shows an example of the inventory amount data 31 managed by the cash handling apparatus 1. The inventory amount data 31 includes the cash inventory amount data 31*a*, and the digital-cash inventory amount data 31*b*. The user of the cash handling apparatus 1 can display the cash inventory amount data 31*a* and the digital-cash inventory amount data 31*b* on the display unit 20 by operating the operation unit 10 to check the contents of each data.

Under an item "total" of the inventory amount data 31 shown in FIG. 5, a total amount of the amount of cash and the amount of digital-cash is displayed. After performing cash handling or digital-cash handling, the cash handling apparatus 1 updates the total amount.

The cash inventory amount data 31*a* shown in FIG. 5 includes the kind, quantity, monetary amount, replenishment threshold, collection threshold, and subtotal of cash. An item "kind" indicates the kind of cash in the cash handling apparatus 1. The kind of cash includes denomination. An item "quantity" indicates the quantity for each kind of the cash. An item "amount" indicates the monetary amount for each kind of the cash. An item "subtotal" indicates a total amount of all cash. The data registered in these items are updated when the cash handling apparatus 1 performs cash handling.

The replenishment threshold indicates a quantity or an amount of cash at which replenishment of the cash handling apparatus 1 with cash is required. The user of the cash handling apparatus 1 can set the replenishment threshold. If cash decreases by performing cash handling and has reached the replenishment threshold, the cash handling apparatus 1 determines that cash replenishment is necessary, and notifies the user of this fact. For example, the cash handling apparatus 1 displays information indicating the necessity of replenishment of cash, on the display unit 20. At this time, the kind of cash for replenishment and the current quantity of this kind of cash may be displayed on the display unit 20. The replenishment threshold may not necessarily be set for each kind, and may be set for each cash storage unit 130.

The collection threshold indicates a quantity or an amount of cash at which collection of cash from the cash handling apparatus 1 is required. The user of the cash handling apparatus 1 can set the collection threshold. If cash increases by performing cash handling and has reached the collection threshold, the cash handling apparatus 1 determines that cash collection is necessary, and notifies the user of this fact. For example, the cash handling apparatus 1 displays information indicating the necessity of collection of cash, on the display unit 20. At this time, the kind of cash to be collected and the current quantity of this kind of cash may be displayed on the display unit 20. The collection threshold may not necessarily be set for each kind, and may be set for each cash storage unit 130.

As shown in FIG. 5, the digital-cash inventory amount data 31*b* includes the kind, number of transfer times, monetary amount, replenishment threshold, collection threshold, and subtotal of digital-cash. An item "kind" indicates the kind of digital-cash in the cash handling apparatus 1. The kind of digital-cash includes: "unauthenticated" indicating that data of digital-cash is not authenticated by the authentication server 3 after having been transferred to the cash handling apparatus 1; and "authenticated" indicating that data of digital-cash has already been authenticated by the authentication server 3. An item "amount" indicates the monetary amount for each kind of digital-cash, and an item "subtotal" indicates a total amount of all digital-cash. The data registered in these items are updated when the cash handling apparatus 1 performs digital-cash handling.

An item "number of transfer times" indicates the number of times of transfers of unauthenticated digital-cash. If there are a plurality of pieces of data of unauthenticated digital-cash, the maximum value of the number of transfer times is displayed. For example, when the upper limit of the number of transfer times is 3, if the number of times displayed under this item is 2, there is digital-cash that can only be transferred one more time. If the displayed number of times is 3, there is digital-cash that cannot be transferred any more. In order to make it easy to check whether or not the number of transfer times has reached the upper limit (threshold), an item "upper limit" of the number of transfer times may be included in addition to the item "number of transfer times". Alternatively, the item "number of transfer times" may indicate a remaining number of times, i.e., how many more times the digital-cash can be transferred, instead of indicating the current number of transfer times. The user of the cash handling apparatus 1 can display the digital-cash inventory amount data 31*b* on the display unit 20 to check the number of transfer times, and take a predetermined countermeasure. In a case where there are a plurality of pieces of data of unauthenticated digital-cash, these pieces of data may not necessarily be put together to display the maximum value of the number of transfer times under the item "number of transfer times". The data of each item shown in FIG. 5 may be displayed for each number of transfer times. Specifically, for example, the amount of unauthenticated digital-cash, of which the number of transfer times is 1, and the amount of unauthenticated digital-cash, of which the number of transfer times is 2, may be displayed separately from each other.

Although not shown in FIG. 5, if a time limit is set for authentication of digital-cash, an item "authentication time limit" may be included in the digital-cash inventory amount data 31*b*. Under this item, information on the authentication time limit of the unauthenticated digital-cash may be displayed. For example, in a case where there are a plurality of pieces of data of unauthenticated digital-cash, an authentication time limit of digital-cash, which has the shortest remaining time, may be displayed. The item “authentication time limit” may not necessarily indicate the authentication time limit itself, and may indicate a remaining time until the authentication time limit. The user of the cash handling apparatus 1 can display the digital-cash inventory amount data 31*b* on the display unit 20 to check the number of transfer times, and take a predetermined countermeasure.

The replenishment threshold in the digital-cash inventory amount data 31*b* indicates an amount at which replenishment of the cash handling apparatus 1 with digital-cash is required. The user of the cash handling apparatus 1 can set the replenishment threshold. If the amount of authenticated digital-cash decreases by performing digital-cash handling and has reached the replenishment threshold, the cash handling apparatus 1 can determine that digital-cash replenishment is necessary. The cash handling apparatus 1 can notify the user of this fact. For example, the cash handling apparatus 1 displays information indicating necessity of replenishment of digital-cash, on the display unit 20. The replenishment threshold may not necessarily be set for only the amount of authenticated digital-cash, and may be set for a total amount of authenticated digital-cash and unauthenticated digital-cash.

The collection threshold in the digital-cash inventory amount data 31*b* indicates an amount at which collection of digital-cash from the cash handling apparatus 1 is required. The user of the cash handling apparatus 1 can set the collection threshold. If digital-cash increases by performing digital-cash handling and the amount thereof has reached the collection threshold, the cash handling apparatus 1 can determine that collection of digital-cash is necessary. The cash handling apparatus 1 can notify the user of this fact. For example, the cash handling apparatus 1 displays information indicating necessity of collection of digital cash, on the display unit 20. The collection threshold may not necessarily be set for the total amount of authenticated digital-cash and unauthenticated digital-cash, and may be set for only the amount of authenticated digital-cash.

As shown in FIG. 3, even when the cash handling apparatus 1 is connected to the authentication server 3 via the network 2, the cash handling apparatus 1 may become incapable of communicating with the authentication server 3 due to communication failure, network breakdown, etc. Even in such a case, the number of transfer times of unauthenticated digital-cash in the cash handling apparatus 1 can be checked. The cash handling apparatus 1 can perform a notification process for notifying information on unauthenticated digital-cash.

Figure 6:
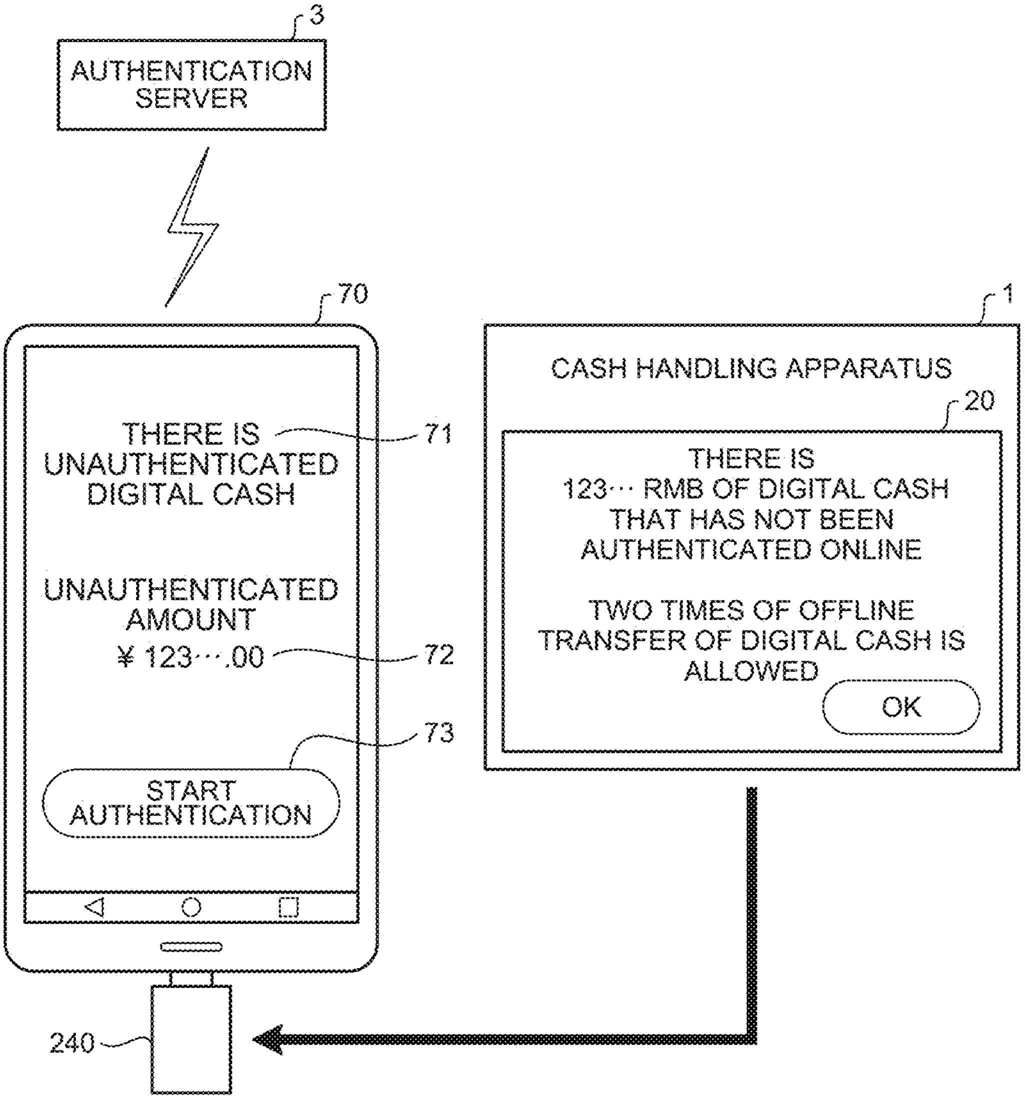
FIG. 6 illustrates an example of a notification process executed by the cash handling apparatus.

FIG. 6 illustrates an example of a notification process performed by the cash handling apparatus 1. For example, in the notification process, information indicating that there is unauthenticated digital-cash, information on the amount of the unauthenticated digital-cash, and information on how many more times the digital-cash can be transferred is displayed on the display unit 20 of the cash handling apparatus 1 as shown in FIG. 6. From the information on the display unit 20, the user of the cash handling apparatus 1 can check the presence of unauthenticated digital-cash, and take a predetermined countermeasure such as checking the connection state with the authentication server 3.

If the apparatus cannot use the network 2, the user can store data of the unauthenticated digital-cash into a portable storage medium used as the digital-cash memory 240, moves the portable storage medium from the cash handling apparatus 1 to a communication terminal 70 such as a smartphone, as shown by an arrow in FIG. 6, and obtain authentication for the digital-cash. The communication terminal 70 connected to the digital-cash memory 240 can display, on its screen, the data of the digital-cash stored in the digital-cash memory 240. For example, as shown in FIG. 6, information 71 indicating that the data of the unauthenticated digital-cash is stored in the digital-cash memory 240 and information on an amount 72 of the unauthenticated digital-cash, are displayed. The user connects the communication terminal 70 to the authentication server 3 by pressing an authentication start button 73, thereby obtaining authentication for the unauthenticated digital-cash.

There is a case where the cash handling apparatus 1 is not connected to the network 2, and is used offline. In such a case, the user of the cash handling apparatus 1 can perform a digital-cash authentication process by using the digital-cash memory 240, and the communication terminal 70 connected to the network 2, as shown in FIG. 6.

In the cash handling apparatus 1, it can be set that data of digital-cash transferred from the outside of the apparatus is temporarily stored in the digital-cash memory 240 and transferred to the digital-cash storage unit 230 in the memory 30 after the stored data has been subjected to authentication by the authentication server 3. That is, it can be set that data of unauthenticated digital-cash is stored in the digital-cash memory 240. If the cash handling apparatus 1 is not connected to the network 2 and the digital-cash cannot be authenticated, the user can take out the digital-cash memory 240 from the cash handling apparatus 1 and obtain authentication for the data by using the communication terminal 70 as shown in FIG. 6. When the digital-cash memory 240 is mounted to the cash handling apparatus 1 after the authentication, the cash handling apparatus 1 automatically transfers the data of the authenticated digital-cash to the digital-cash storage unit 230 in the memory 30.

In a case where a time limit is set for authentication of digital-cash, the cash handling apparatus 1 can perform the notification process at a predetermined timing. In the notification process, information that there is unauthenticated digital-cash, information on the amount of the unauthenticated digital-cash, and information on the remaining time until the authentication time limit are displayed on the display unit 20 of the cash handling apparatus 1. The user of the cash handling apparatus 1 can check the presence of the unauthenticated digital-cash from the information on the display unit 20, and take a predetermined countermeasure such as checking the state of connection with the authentication server 3.

In this case as well, as in the case shown in FIG. 6, the user can store data of the unauthenticated digital-cash into the digital-cash memory 240, move the digital-cash memory 240 from the cash handling apparatus 1 to the communication terminal 70 such as a smartphone, and obtain authentication for the data.

In the present embodiment, the cash handling and the digital-cash handling to be performed by the cash handling apparatus 1 include the depositing process, the dispensing process, the replenishment process, the collection process, and the reconciliation process. However, the cash handling apparatus 1 may not necessarily perform all these processes, and may perform only some of the processes. The cash handling apparatus 1 may perform a process other than the depositing process, the dispensing process, the replenishment process, the collection process, and the reconciliation process. For example, the cash handling apparatus 1 may be installed in a store, and may perform a cash-out process for dispensing, by cash or digital-cash, withdrawn by the customer from his/her account in a financial institution. For example, the cash handling apparatus 1 may perform an exchange process for converting between cash and digital-cash.

In the present embodiment, the cash handling apparatus 1 is mainly used in a store, but the type and the installation place of the cash handling apparatus 1 are not particularly limited. For example, the cash handling apparatus 1 may be used in a financial institution. For example, the cash handling apparatus 1 may be an apparatus such as an ATM, a money changer, a vending machine, etc.

In the present embodiment, the cash handling apparatus 1 includes the digital-cash handling unit. However, a part of the function of the digital-cash handling unit may be provided by an external device or a cloud server. Specifically, at least one of the digital-cash recognition unit 220 and the digital-cash storage unit 230 is not provided in the cash handling apparatus 1, but is provided by the external device or the cloud server, and the cash handling apparatus 1 uses the unit in the external device or the cloud server. The cash handling apparatus 1 may communicate with the external device or the cloud server via the network 2 to perform digital-cash handling, or the digital-cash handling may be performed by using the communication terminal 70 as in the process described with reference to FIG. 6.

In the present embodiment, the cash handling apparatus 1 includes the digital-cash recognition unit 220. However, if the cash handling apparatus 1 does not include the digital-cash recognition unit 220, the processes described to be performed by the digital-cash recognition unit 220 in the present embodiment are performed by the digital-cash depositing/dispensing unit 210.

The present embodiment includes an example in which the digital-cash depositing/dispensing unit 210 performs acquisition of the amount of the digital-cash, and the recognition process for checking authenticity of the data of the digital-cash when the cash handling apparatus 1 exchanges data of digital-cash with the external device. For example, if the digital-cash depositing/dispensing unit 210 is configured to receive and output only predetermined data, i.e., data of digital-cash, while refusing other data, the data processing to be performed by the digital-cash depositing/dispensing unit 210 includes the recognition process of the digital-cash. In addition, the process for counting the number of data of digital-cash by the digital-cash depositing/dispensing unit 210 is the process for counting the digital-cash and acquiring the monetary amount. However, the digital-cash depositing/dispensing unit 210 may not perform at least one of the amount acquisition and the recognition process. For example, the digital-cash depositing/dispensing unit 210 may perform only exchange of data of digital-cash, and the digital-cash recognition unit 220 may perform acquisition of the amount of digital-cash and the recognition process. For another example, the digital-cash depositing/dispensing unit 210 may acquire only the amount based on the number of the data of digital-cash, and the recognition process may be performed by the digital-cash recognition unit 220.

A cash handling apparatus according to one aspect of the present disclosure includes: a cash depositing unit for depositing cash; a cash recognition unit configured to recognize a kind and authenticity of the cash; a cash storage unit configured to store the cash; a digital cash depositing unit for depositing digital cash that is a central bank digital currency for which one piece of data is issued per predetermined unit amount; and a digital cash storage unit configured to store the digital cash. In a depositing process, the cash handling apparatus accepts depositing of at least one of cash and digital cash. In the depositing process of cash, cash deposited from the cash depositing unit is recognized by the cash recognition unit and stored in the cash storage unit. In the depositing process of digital cash, data of digital cash inputted from the digital cash depositing unit is stored in the digital cash storage unit.

In the above configuration, the cash handling apparatus may transmit the data of the digital cash to an external device that recognizes authenticity of the data, and receive a recognition result of the data from the external device.

In the above configuration, the cash handling apparatus may further include a digital cash recognition unit configured to recognize authenticity of the data of the digital cash.

In the above configuration, the cash handling apparatus may further include: a cash dispensing unit for dispensing cash fed out from the cash storage unit; and a digital cash dispensing unit for dispensing digital cash read out from the digital cash storage unit. In a dispensing process, the cash handling apparatus may dispense at least one of cash and digital cash. In the dispensing process of cash, cash equivalent to an amount to be dispensed is fed out from the cash storage unit and is dispensed from the cash dispensing unit. In the dispensing process of digital cash, data of digital cash equivalent to an amount to be dispensed is read out from the digital cash storage unit and is transferred to an external device via the digital cash dispensing unit.

In the above configuration, the cash handling apparatus may manage cash inventory amount data indicating a kind and a quantity of cash in the cash handling apparatus, and digital cash inventory amount data indicating an amount of digital cash in the cash handling apparatus. The cash handling apparatus may update the cash inventory amount data when performing the depositing process and the dispensing process of cash, and may update the digital cash inventory amount data when performing the depositing process and the dispensing process of digital cash.

In the above configuration, the cash handling apparatus may further include a digital cash memory that is mountable and dismountable with respect to the cash handling apparatus. The cash handling apparatus may perform exchange of data of digital cash with an external device via the digital cash memory to transfer the digital cash between the cash handling apparatus and the external device.

In the above configuration, the cash handling apparatus may further include a cash cassette that is mountable and dismountable with respect to the cash handling apparatus. The cash handling apparatus may perform exchange of data of digital cash with an external device via a digital cash memory included in the cash cassette to transfer the digital cash between the cash handling apparatus and the external device.

In the above configuration, the cash handling apparatus may transmit and receive data of digital cash to and from an external device to transfer the digital cash between the cash handling apparatus and the external device.

In the above configuration, the cash handling apparatus may communicate with a predetermined external device to obtain authentication for each piece of data of digital cash in the cash handling apparatus.

In the above configuration, the cash handling apparatus may notify information on the number of transfer times of unauthenticated digital cash.

In the above configuration, if the cash handling apparatus is unable to communicate with the predetermined external device, the cash handling apparatus may obtain authentication for each piece of data of the digital cash from the predetermined external device after communication is enabled.

In the above configuration, at least one of the digital cash recognition unit and the digital cash storage unit is provided in a cloud server that is communicably connected to the cash handling apparatus.

As described above, the cash handling apparatus can handle digital-cash like conventional cash. For example, the user of the cash handling apparatus can deposit money into the apparatus with cash, digital-cash, or both cash and digital-cash. Moreover, for example, the user can cause the cash handling apparatus to dispense cash, digital-cash, or both cash and digital-cash. The user of the cash handling apparatus can perform various types of conventional cash handling by using both cash and digital-cash.

The invention claimed is:

1. A cash handling apparatus comprising:

a cash depositing port receiving cash to be deposited;

a cash recognition circuit configured to recognize a kind and authenticity of the cash;

a cash storage storing the cash;

a digital cash depositing unit for depositing digital cash that is a central bank digital currency for which one piece of data is issued per predetermined unit amount;

a digital cash storage storing the digital cash; and a cash cassette that is mountable to and dismountable from the cash handling apparatus, wherein in a depositing process, the cash handling apparatus accepts depositing of at least one of cash and digital cash, in the depositing process of cash, cash deposited from the cash depositing port is recognized by the cash recognition circuit and stored in the cash storage, in the depositing process of digital cash, data of digital cash inputted from the digital cash depositing unit is stored in the digital cash storage, the cash cassette includes a digital cash memory, and the cash handling apparatus performs exchange of data of digital cash with an external device via the digital cash memory of the cash cassette to transfer the digital cash between the cash handling apparatus and the external device.

2. The cash handling apparatus according to claim 1, wherein the cash handling apparatus transmits the data of the digital cash to the external device which recognizes authenticity of the data, and receives a recognition result of the data from the external device.

3. The cash handling apparatus according to claim 1, further comprising a digital cash recognition circuit configured to recognize authenticity of the data of the digital cash.

4. The cash handling apparatus according to claim 1, further comprising:

a cash dispensing port for dispensing cash fed out from the cash storage; and a digital cash dispensing unit for dispensing digital cash read out from the digital cash storage, wherein in a dispensing process, the cash handling apparatus dispenses at least one of cash and digital cash, in the dispensing process of cash, a cash equivalent to an amount to be dispensed is fed out from the cash storage and is dispensed from the cash dispensing port, and in the cash dispensing process of digital cash, data of digital cash equivalent to an amount to be dispensed is read out from the digital cash storage and is transferred to the external device via the digital cash dispensing unit.

5. The cash handling apparatus according to claim 1, wherein the cash handling apparatus manages cash inventory amount data indicating a kind and a quantity of cash in the cash handling apparatus, manages digital cash inventory amount data indicating an amount of digital cash in the cash handling apparatus, updates the cash inventory amount data when performing the depositing process and the dispensing process of cash, and updates the digital cash inventory amount data when performing the depositing process and the dispensing process of digital cash.

6. The cash handling apparatus according to claim 1, wherein the cash handling apparatus transmits and receives data of digital cash to and from the external device to transfer the digital cash between the cash handling apparatus and the external device.

7. The cash handling apparatus according to claim 1, wherein the cash handling apparatus communicates with a predetermined external device to obtain authentication for each piece of data of digital cash in the cash handling apparatus.

8. The cash handling apparatus according to claim 7, wherein the cash handling apparatus notifies information on the number of transfer times of the digital cash.

9. The cash handling apparatus according to claim 7, wherein in a case that the cash handling apparatus is unable to communicate with the predetermined external device, the cash handling apparatus obtains authentication for each piece of data of the digital cash from the predetermined external device after communication is enabled.

10. The cash handling apparatus according to claim 1, wherein at least one of a digital cash recognition circuit and the digital cash storage is provided in a cloud server.

* * * * *